Nov. 14, 1933. R. M. MAGNUSON Re. 18,995
AUTOMATIC OILING SYSTEM FOR DEEP WELL TURBINE PUMPS
Original Filed Feb. 14, 1927
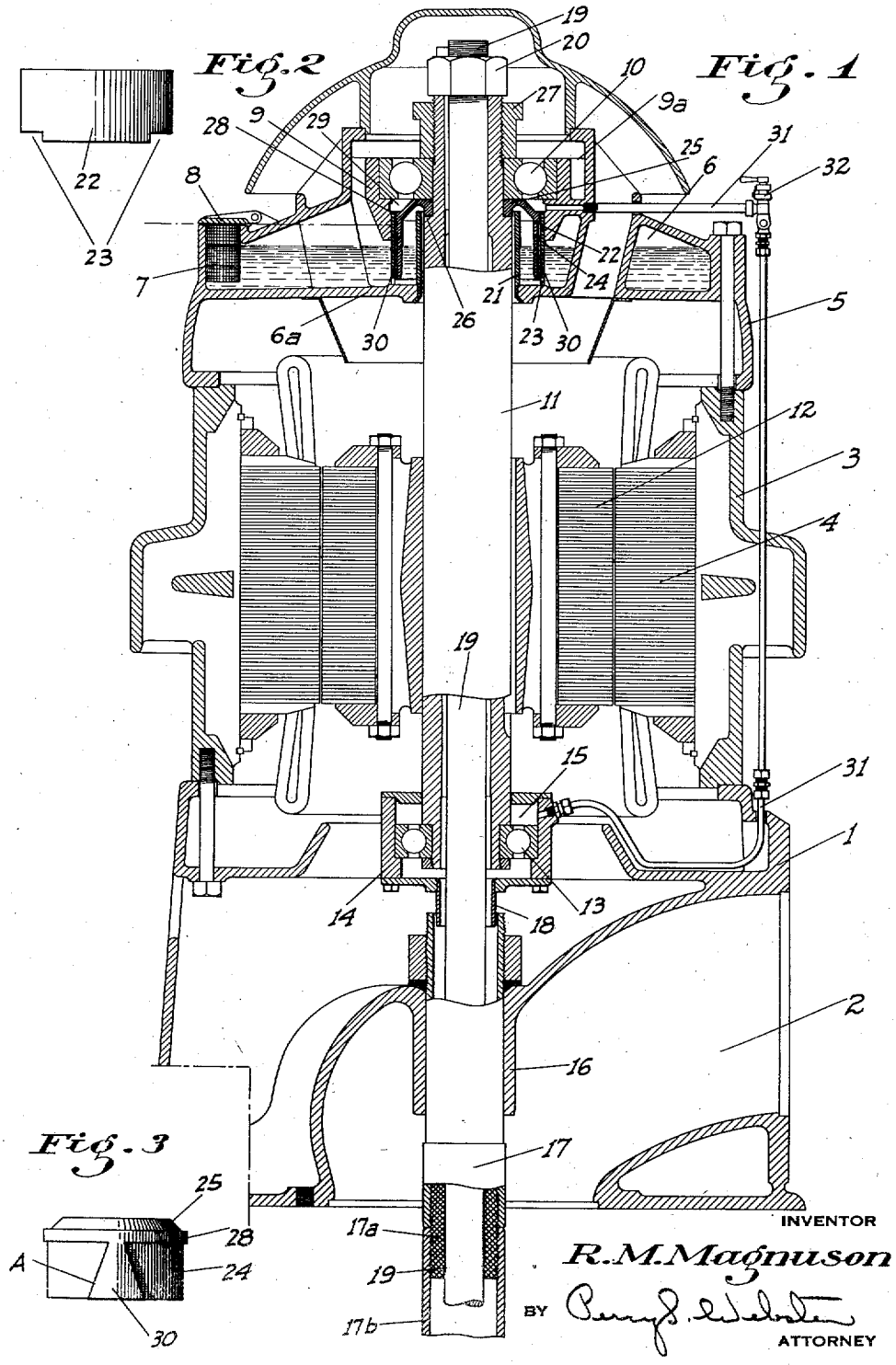

Reissued Nov. 14, 1933

Re. 18,995

UNITED STATES PATENT OFFICE 18,995

AUTOMATIC OILING SYSTEM FOR DEEP-WELL TURBINE PUMPS

Roy M. Magnuson, San Jose, Calif., assignor, by mesne assignments, to A. D. Cook, Inc., Lawrenceburg, Ind., a corporation of Indiana Original No. 1,750,898, dated March 18, 1930, Serial No. 168,060, February 14, 1927. Application for reissue October 5, 1932. Serial No. 636,364

11 Claims. (Cl. 308—170)

This invention relates to improvements in oiling systems for pumping apparatus, in which a vertical electric motor is mounted in direct connection with the pump head and is directly connected with the pump shaft, which is supported by and suspended from bearings in the head. In pump operating mechanisms of this character there is one bearing above the motor and another one below, and of course it is necessary that these bearings shall be kept constantly lubricated while the pump is operating. At the same time it is not desirable that oil shall continue to feed when the pump is stopped, nor that an excessive amount shall be fed to the bearings at any time, since this is only a waste of oil.

The principal object of my invention therefore is to provide an automatically operating oiling system which will operate only when the motor is in operation and which controls the feed of oil to the bearings in the proper quantity according to the speed of the motor. The operating parts of the system and the oil reservoir itself are contained within the pump head so that nothing projects on the outside of the head to possibly be damaged or to spoil the neat and symmetrical appearance of the head. Also the operating mechanism is of such a nature that there is nothing to wear or get out of order and no adjustments or other attention on the part of an operator are ever necessary, other than keeping a supply of oil in the reservoir. This being of large capacity even such attention is relatively infrequent.

A further object of the invention is to arrange the parts of the oil system in such a manner that there will be no churning or disturbing of the main body of oil such as causes the formation of a frothy emulsion.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views:

Fig. 1 is a sectional elevation of a certain standard form of pump head and motor arrangement showing my improved oiling system incorporated therewith.

Fig. 2 is a detached side elevation of a slotted sleeve member.

Fig. 3 is a similar view of an oil impelling member.

Referring now more particularly to the characters of reference on the drawing, the pump head structure illustrated comprises a bottom supporting casting 1 adapted at its lower end to be connected to a well casing and having a discharge passage 2 disposed to lead upwardly from the casing to one side of the member 1. Supported on and secured to the member 1 is a cylindrical housing 3 in which the stator structure 4 of the electric driving motor is mounted. Supported by and fixed on the housing 3 is the end-bell casting 5. This end-bell is formed with a continuous enclosed chamber 6 to serve as an oil reservoir, the chamber having a filler hole on one side with a screen cup 7 depending into the hole and normally covered by a cap 8. Formed with the bell above the member 6 and somewhat below the top of the bell is a cylindrical support 9 for a thrust ball bearing 10, the inner race of which engages a sleeve 11 which projects downwardly therefrom and has the rotor structure 12 of the motor affixed thereto in horizontal alinement with the stator 4.

Below the stator the sleeve terminates at and engages the inner race of an annular ball-bearing 13 which is mounted in a supporting ring 14 formed with the member 1 above the passage 2. This ring is covered both on top and bottom so that a chamber 15 is formed in which the ball-bearing is enclosed. The top wall of the passage 2 is formed with a downwardly projecting cylindrical boss or sleeve 16 in which is mounted a short tubular member 17, concentric with the sleeve 11 and adapted at its lower end for connection to a shaft-bearing bushing 17*a*, to which in turn is connected a length of piping 17*b*. A short tube 18 is secured to the bottom member of the chamber 15 and depends therefrom and into the top of the tube 17 a short distance. The pump shaft 19 projects through the members 17, 18, and 11 in spaced relation thereto to the upper end of the latter, to which it is keyed and from which it is suspended by a nut 20.

Secured to and projecting upwardly from the bottom member 6*a* of the oil reservoir in close but non-engaging relationship with the sleeve 11 is a sleeve extension whose upper end is above the cap 8 and hence above the maximum oil level in the reservoir. Another sleeve 22 is secured in and depends from the bearing support 9 below the bearing to the bottom member 6*a*, having spaced circumferential slots 23 cut around its bottom. This sleeve is concentric with and outwardly of the sleeve 21. Turnable in the sleeve 22 is an oil impeller comprising a cylinder 24 having a top flange 25 which overhangs the top of the sleeve 21 and rests on an annular shoulder 26 formed on the sleeve 11. This flange is clamped against the shoulder so as to turn with the sleeve 11 by means of a nut 27 on the upper end of the sleeve which engages the inner race of the bearing 10, which in turn bears against the top of the flange. The upper end of the cylinder 24 is formed with an outwardly projecting narrow band or flange 28, which has a free running fit with the top of the sleeve 22. This band is somewhat below the top of the flange 25 so that a small annular chamber 29 is formed between the impeller and the bottom of the bearing 10. Formed with the cylinder 24 below the band 28 are one or more flat bosses 30 which have a running engagement with the sleeve 22. The bottom of the cylinder and bosses are above the bottom of said sleeve or substantially in line with the top of the slots 23. The vertical edge faces of the bosses are set on an angle in a vertical plane as shown at A, so that in the rotation of the cylinder any oil caught by said faces will be thrown upwardly. Leading from the chamber 29 (which is above the cylinder and sleeve 22) to the outside of the bell 5 is a horizontal conduit 31 which then extends downwardly to the member 1 and thence inwardly thereof to a connection with the chamber 15 above the bearing 13. A control valve 32 is interposed in this conduit preferably at the junction of the upper horizontal and vertical portions.

In operation as long as there is oil in the reservoir such oil can pass freely into the space between the sleeve 22 and cylinder 24 below the band 28 which is above the maximum oil level. With the rotation of the cylinder the oil between the cylinder and sleeve 22 is caught by the sloping surfaces A and thrown upwardly against the bottom of the band 28. There is sufficient space between the band and the sleeve 22 to cause a certain amount of such oil to pass upwardly therebetween so as to be thrown against and engage the adjacent surfaces of the bearing 10. The oil then collects in the chamber 29 from which it escapes through the conduit 31 to the lower bearing 13. Oil collecting in the chamber 15 after passing through this bearing is discharged into the sleeve 17 through the tube 18 and passes on down to lubricate the various other pump shaft bearings.

It will be noted that while the rotating cylinder 24 is constantly engaged with a certain amount of oil tending to churn the same and form an emulsion, this amount is very small and is isolated from the main body of oil by the sleeve 22. This main body of oil therefore remains undisturbed at all times and there is no tendency in the operation of the system for the oil to froth and expand so as to cause it to spill out through the cap 8.

The bearing support 9 is spaced from the side walls of the bell, being connected thereto by radial ribs 9*a*, so as to leave vertical passages between the bell and support. This enables excess oil thrown upwardly and outwardly from the bearing 10 (due to the centrifugal action) to be first caught by the side wall of the bell, and to then drain back into the main reservoir.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a deep-well pump, a vertical shaft, an oil reservoir near the upper end of said shaft and closed on the bottom, a bearing for said shaft above said reservoir, a bearing support for said bearing, said support being arranged to permit the return to said reservoir of oil discharged from the upper end of said bearing, one or more bearings for the shaft below said reservoir, a passage leading upwardly from said reservoir and discharging upwardly into said first named bearing, means functioning solely with the rotation of said shaft for elevating oil through said passage to said first named bearing, and an oil conduit connected to said passage between said oil-elevating means and said first named bearing and leading to the bearings below said reservoir.

2. In a deep-well pump, a vertical-shaft electric motor having upper and lower end-frames provided respectively with bearings for the motor shaft, a pump shaft connected to said motor shaft for rotation therewith and extending downwardly therefrom, bearings for said pump-shaft, an oil reservoir in one of said end frames below the motor-shaft bearing therein, a passage leading upwardly from said reservoir and discharging upwardly into the bearing above it, means functioning solely with the rotation of said shaft for elevating oil from said reservoir through said passage, and an oil conduit connected to said passage between the reservoir and bearing for supplying oil to said pump-shaft bearings.

3. In a deep-well pump, a vertical-shaft electric motor having upper and lower end-frames, a pump shaft connected to said motor shaft for rotation therewith and extending downwardly therefrom, bearings for said pump-shaft, an oil reservoir and an outlet therefor formed in one of said end frames, the reservoir being closed on the bottom and said outlet passage being above the normal oil level in the reservoir, means functioning with the rotation of the shaft to raise the oil from its normal level to the outlet, and passage means for conveying oil under the influence of gravity from said outlet passage to said pump-shaft bearings.

4. The invention set forth in claim 3 with the additions that said outlet passage has an open upper end and that said passage means is connected to said outlet passage at a point below such open upper end.

5. In a deep-well pump, a vertical shaft, an oil reservoir near the upper end of said shaft, a bearing for said shaft above said reservoir, an oil-pump for elevating oil from said reservoir to said bearing, said oil-pump including an oil-impeller member concentric with and mounted on said shaft for rotation therewith, one or more bearings for the shaft below said reservoir. and passage means for conveying a part of the oil elevated by said pump to the bearing above the reservoir and another part of such oil to a bearing below the reservoir.

6. In a deep-well pump, a frame, a vertical shaft, an anti-friction bearing for said shaft, a bearing support for said bearing, an oil-reservoir disposed below said bearing, an oil passage extending downwardly from said bearing into the oil in said reservoir and concentric with said shaft, provisions on said shaft within said passage for elevating oil from the reservoir through said bearing, the upper end of said bearing being open to permit the escape of oil, a bearing for said shaft located below said reservoir, and a branch passage communicating with said first named passage below the top of said bearing and extending to the bearing located below the reservoir.

7. The invention set forth in claim 6 with the addition of a valve in said branch passage for regulating the rate of oil-flow therethrough.

8. In a deep-well pump, a vertical shaft, an oil reservoir, a passage extending upwardly from said reservoir and having an overflow opening above the oil level in said reservoir, means functioning with the rotation of said shaft for raising oil through said passage and out said overflow opening, a bearing for said shaft below said reservoir, and a branch oil passage connected to said first named passage between the overflow opening and oil-raising means and leading to said bearing.

9. In a deep-well pump, a vertical shaft, an oil reservoir, a passage extending upwardly from said reservoir and having an overflow opening discharging into said reservoir and located above the oil level therein, means functioning with the rotation of said shaft for raising oil through said passage and out said overflow opening, a bearing for said shaft below said reservoir, and a branch oil passage connected to said first named passage between the overflow opening and oil-raising means and leading to said bearing.

10. The invention set forth in claim 8 with the addition of a valve in said branch passage for controlling the rate of oil-flow therethrough.

11. The invention set forth in claim 8 with the addition of a bearing for said shaft above the reservoir, at least a part of said first named passage being concentric with said shaft and containing the last named bearing.

ROY M. MAGNUSON.